United States Patent
Neighbor et al.

(10) Patent No.: US 12,234,028 B2
(45) Date of Patent: Feb. 25, 2025

(54) AUTOMATED AIR-TO-AIR REFUELING USING KEYPOINT-BASED PERCEPTION OF AIRCRAFT FLIGHT CONTROL SURFACES

(71) Applicant: The Boeing Company, Arlington, VA (US)

(72) Inventors: Joshua Neighbor, Seattle, WA (US); Daniel O'Shea, Seattle, WA (US)

(73) Assignee: The Boeing Company, Arlington, VA (US)

( * ) Notice: Subject to any disclaimer, the term of this patent is extended or adjusted under 35 U.S.C. 154(b) by 78 days.

(21) Appl. No.: 18/153,934

(22) Filed: Jan. 12, 2023

(65) Prior Publication Data
US 2024/0239513 A1  Jul. 18, 2024

(51) Int. Cl.
*B64D 47/08* (2006.01)
*B64D 39/00* (2006.01)

(52) U.S. Cl.
CPC .............. *B64D 47/08* (2013.01); *B64D 39/00* (2013.01)

(58) Field of Classification Search
None
See application file for complete search history.

(56) References Cited

U.S. PATENT DOCUMENTS

| | | | |
|---|---|---|---|
| 2008/0250423 A1* | 10/2008 | Bush | G08G 5/0034 701/423 |
| 2023/0215041 A1* | 7/2023 | Nguyen | G06V 20/17 382/103 |

OTHER PUBLICATIONS

Zelin Zhao et al., Estimating 6D Pose From Localizing Designated Surface Keypoints, pp. 1-9.

* cited by examiner

*Primary Examiner* — Heather R Jones
(74) *Attorney, Agent, or Firm* — Alleman Hall & Tuttle LLP

(57) ABSTRACT

An automated air-to-air refueling (A3R) system is usable with a tanker aircraft having a refueling boom. The system includes a camera connected to the tanker in proximity to the refueling boom which outputs a video stream of the boom and a fuel-receiving aircraft/receiver during an aerial refueling process. The system also includes a human-machine interface ("HMI") located aboard the tanker, and an electronic control unit ("ECU") in communication with the camera and HMI. The ECU identifies keypoints on the receiver indicative of flight control surfaces thereof, tracks corresponding positions of the flight control surfaces in real-time, and predicts a change in position of the receiver in free space as a predicted 3D position using the corresponding positions. The HMI also outputs a directional indicator indicative of the predicted 3D position, e.g., as a graphical overlay to a display screen.

20 Claims, 3 Drawing Sheets

AUTOMATED AIR-TO-AIR REFUELING USING KEYPOINT-BASED PERCEPTION OF AIRCRAFT FLIGHT CONTROL SURFACES

BACKGROUND

In-flight aerial refueling, also referred to as air-to-air refueling, is the process by which aviation fuel is transferred from a fuel-supplying aircraft ("tanker") to a fuel-receiving aircraft ("receiver") while the tanker and the receiver fly in close formation. Air-to-air refueling allows the receiver to remain airborne for extended periods of time and increase its flight range relative to traditional ground-based refueling.

During boom refueling in particular, aviation fuel is transferred to the receiver via an intervening boom apparatus. The refueling boom is typically controlled by one or more boom operators situated aboard the tanker. Boom refueling requires the presence of a receptacle on a fuselage or another accessible surface of the receiver. Using one or more control input devices, the boom operators carefully align the boom with the receptacle while the respective pilots of the tanker and receiver minimize relative motion of the two aircraft. Once the receptacle and the boom are properly aligned, the boom securely engages the receptable. Aviation fuel then flows to the receiver through the intervening boom.

SUMMARY

The present disclosure relates to machine learning-based systems and methods for performing an automated air-to-air refueling ("A3R") operation. In particular, embodiments of the present disclosure enable "keypoint"-based perception of aircraft control surfaces of a receiving aircraft ("receiver") when performing the A3R operation, during which a substantially rigid refueling boom is controlled, typically using by-wire control inputs or commands from one or more boom operators situated aboard a fuel supply aircraft or "tanker."

As appreciated in the art, modern boom refueling operations of the type summarized above typically situate a team of boom operators aft of a cockpit of the tanker and thus out of direct view of both the boom and the receiver. The boom operators in this position are assisted in accurately visualizing the boom and receiver by a live video stream, which in turn is provided by one or more cameras mounted to the tanker in proximity to the boom. The boom operators are thus able to view real-time video images of the boom and receiver on a high-resolution display screen while monitoring the ongoing refueling process.

In accordance with an aspect of the disclosure, an A3R system is provided for use with tanker having a refueling boom. The A3R system includes a camera connected to the tanker in proximity to the boom. The camera outputs a video stream of the boom and a receiver during an aerial refueling process. The A3R system described herein also includes a human-machine interface ("HMI") and an electronic control unit ("ECU") in wired or wireless communication with the camera and the HMI.

The ECU in one or more embodiments is configured to identify "keypoints" on the receiver. The keypoints are individually or collectively indicative of objects of interest in the video stream, in this instance flight control surfaces of the receiver such as flaps, rudders, ailerons, etc. The ECU is also configured to track corresponding positions of the flight control surfaces in real-time, and to predict a change in a three-dimensional ("3D") position of the receiver as a predicted 3D position using the corresponding positions. The ECU then outputs a directional indicator to the HMI that is indicative of the predicted 3D position. Responsive boom control actions may be performed based on or in response to the status of the directional indicator, with such control actions possibly being implemented by the boom operators or via the ECU in different approaches.

Also disclosed herein is a method for refueling a receiver during an aerial refueling process, including receiving from a camera during the aerial refueling process, via an ECU aboard a tanker having a refueling boom, a real-time video stream of the receiver and the refueling boom, wherein the camera is connected to the tanker in proximity to the refueling boom. The method also includes identifying keypoints on the receiver indicative of flight control surfaces thereof, and tracking corresponding positions of the flight control surfaces in real-time via the ECU. Additionally, the method includes predicting a change in a 3D position of the receiver, as a predicted 3D position, using the corresponding positions of the one or more flight control surfaces, and then outputting a directional indicator to the HMI, via the ECU, indicative of the predicted 3D position.

A tanker is also disclosed herein. In one or more embodiments, the tanker includes a fuselage, or more wings, a refueling boom, and an A3R system. The fuselage has a nose and a tail end, and is configured to transport a supply of aviation fuel. The refueling boom is connected to the tail end. The A3R system in this embodiment includes a rearward-facing monocular camera connected to the tail end of the fuselage of the tanker in proximity to the refueling boom. The rearward-facing monocular camera is configured to output a video stream of the refueling boom and a receiver during an aerial refueling process. The A3R system also includes an HMI having a display screen, with the A3R system also including an ECU in communication with the rearward-facing monocular camera and the HMI.

The ECU is configured to identify, using a keypoint machine learning model, keypoints on the receiver indicative of flight control surfaces thereof, track corresponding positions of the flight control surfaces in real-time using the keypoints, predict a change in a 3D position of the receiver as a predicted 3D position using the corresponding positions of the one or more flight control surfaces, and output a directional indicator to the HMI indicative of the predicted 3D position. The directional indicator includes a graphical overlay on the display screen in accordance with one or more embodiments.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

Figures 1, 2:
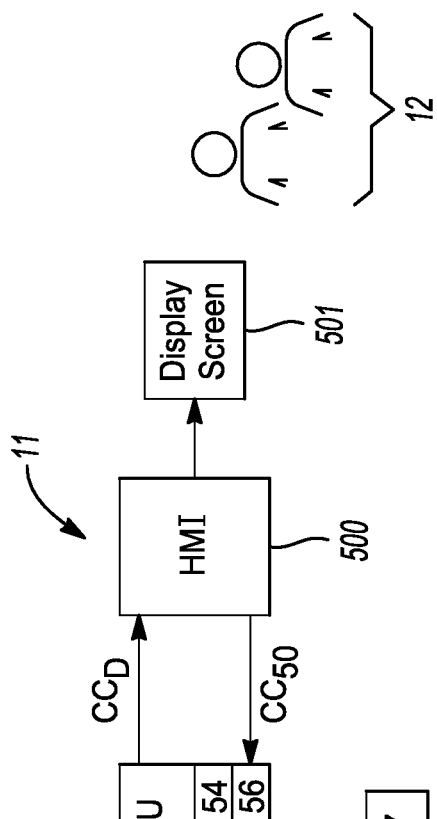
FIG. 1 illustrates a representative automated air-to-air refueling ("A3R") process during which a tanker delivers aviation fuel to a receiver while the tanker and the receiver fly in close formation.
FIG. 2 is a schematic circuit diagram of a representative A3R system operable for performing the A3R process.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are illustrative examples, and that other embodiments can take various and alternative forms. The Figures are not necessarily to scale, and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the drawings, wherein like reference numbers refer to the same or like components in the several Figures, a fuel-supplying aircraft ("tanker") 10 and a fuel-receiving aircraft ("receiver") 14 are depicted in FIG. 1 while engaged in a representative aerial refueling operation. Boom operators 12 (see FIG. 2), i.e., human personnel trained to perform the disclosed aerial refueling tasks, are situated within the tanker 10, such as in proximity to a cockpit 20 of the tanker 10. The boom operators 12 control operation of a refueling boom 16 during the aerial refueling operation. As appreciated in the art, aerial or "air-to-air" refueling typically relies heavily on human judgment. The present disclosure seeks to improve upon the current state of the art of aerial refueling in at least this respect.

Referring briefly to FIG. 2, attendant benefits of the present disclosure are accomplished using an Automated Air-to-Air ("A3R") system 11. The A3R system 11 as described below employs automated computer vision/machine learning-based solutions to identify, track, and account for predicted motion of the receiver 14 of FIG. 1 during aerial refueling. The A3R system 11 as contemplated herein is in wired or wireless/remote communication with one or more cameras 25, which provide a clear view of the boom 16 and the receiver 14. Each camera 25 may be embodied as rearward-facing monocular cameras of an application-specific spectral capability. For example, the camera 25 may be capable of collecting real-time image data in the human-visible/red-green-blue spectral range, or using near-infrared, infrared, or other portions of the electromagnetic spectrum, e.g., under heavy cloud cover or low-light conditions.

The boom operators 12 of FIG. 2 impart flight control inputs (arrow $CC_{50}$) to an electronic control unit ("ECU") 50, e.g., using a human-machine interface ("HMI") 500 in wired or wireless communication with the ECU 50. In accordance with an aspect of the disclosure, the boom operators 12 are assisted in the accurately visualizing the receiver 14 and the boom 16 using image data in the form of a video stream (arrow 250) from the camera(s) 25. Constituent two-dimensional ("2D") image frames of the video stream (arrow 250) contain therein images of at least the receiver 14 and the boom 16.

The A3R system 11 ultimately outputs a real-time directional indicator (arrow $CC_D$), e.g., a suitable graphical overlay, annotation, and/or text message, to the HMI 500 to assist the boom operators 12 in tracking the current three-dimensional ("3D") position of the receiver 14 during aerial refueling. The boom operators 12, via the intervening ECU 50, can transmit flight control signals (arrow $CC_{17}$) by-wire to flight control surfaces 17 of the boom 16 shown in FIG. 1. Machine learning-based real-time tracking of the receiver 14 in free space is performed herein by monitoring and tracking its various flight control surfaces, as described below in further detail with particular reference to FIGS. 4 and 5.

Referring once again to FIG. 1, the representative tanker 10 includes a fuselage 18 connected to wings 13. In the illustrated configuration, the fuselage 18 may define a cargo bay with one or more fuel tanks (not shown) holding aviation fuel for eventual delivery to the receiver 14. Each of the wings 13 may be connected in some configurations to a refueling pod 21 and one or more engines 22, e.g., jet turbines, with the engines 22 providing sufficient thrust for propelling the tanker 10. The fuselage 18 also defines the cockpit 20 proximate a nose 23 of the tanker 10. An empennage assembly 19 is connected to the fuselage 18 diametrically opposite the nose 23, i.e., at a tail end 123 of the tanker 10, with the empennage assembly 19 in the representative construction of FIG. 1 including a vertical stabilizer 19V and horizontal stabilizers 19H.

The tanker 10 is equipped to perform aerial refueling operations of the types contemplated herein, e.g., as a structurally-modified commercial passenger or transport aircraft having a reinforced airframe suitable for securely transporting the above-noted aviation fuel and associated fuel tanks, and equipped with mission-suitable avionics and control systems. Such modifications collectively enable the tanker 10 to transport aviation fuel to a predetermined rendezvous site with the receiver 14. Upon reaching the rendezvous site, the tanker 10 flies in close formation with the receiver 14, the particular configuration of which may differ from that which is depicted in FIG. 1. For example, the tanker 10 may be used to refuel any suitably-equipped receiver 14, such as but not limited to cargo planes, other tankers, surveillance and/or reconnaissance aircraft, air traffic control aircraft, weather monitoring aircraft, etc. The depicted construction of the receiver 14 of FIG. 1 is therefore illustrative of just one possible embodiment thereof.

During the aerial refueling operation represented in FIG. 1, the tanker 10 deploys the refueling boom 16 based on the real-time monitoring and control provided by the boom operators 12 and the A3R system 11 depicted in FIG. 2. The tanker 10 in some configurations could also deploy flexible drogues (not shown), with each drogue fluidly coupled to the refueling pods 21 or to the fuselage 18. The boom 16 moves within the slipstream of the tanker 10 with a level of control afforded by the flight control surfaces 17. Control inputs to the flight control surfaces 17 of the boom 16 are commanded by the ECU 50 aboard the tanker 10, which in turn may be interacted with by the boom operators 12 via the HMI 500. The boom operators 12 of FIG. 2 ultimately guide a nozzle end 160 of the boom 16 into a mating receptacle 27 located on the receiver 14, with the location of the receptacle 27 possibly varying with the construction of the receiver 14.

Referring once again to FIG. 2, the boom operators 12 monitor and control operation of the refueling boom 16 of FIG. 1 with the assistance of the HMI 500. The HMI 500 may include, by way of example and not of limitation, a high-resolution display screen or screens 501, e.g., touch-sensitive screens, as well as keyboards, joysticks, dials, etc. Ultimately, the electronic control signals (arrow $CC_{50}$) from the HMI 500 cause the ECU 50, using a processor 52 and memory 54, to electronically control a corresponding attitude of the flight control surfaces 17 situated on the boom 16 of FIG. 1. In other words, the boom 16 is controllable in a fly-by-wire manner such that a kinematic chain does not exist between the boom operators 12 and the boom 16. Other control implementations may be envisioned within the scope of the disclosure, including semi-autonomous or fully-autonomous control implementations, and therefore the present solutions are not limited to crewed aerial refueling operations as described herein.

The ECU 50 of FIGS. 1 and 2 operates as a process controller, and may be optionally embodied as one or more computer systems configured to execute computer-readable instructions embodying a method 50M, a non-limiting exemplary embodiment of which is described below with reference to FIG. 4. As contemplated herein, the processor(s) 52 may be implemented as a microcontroller, one or more Application Specific Integrated Circuit(s) (ASICs), Field-Programmable Gate Array (FPGAs), electronic circuits, central processing units (CPUs), etc. The memory 54 in turn includes associated transitory and non-transitory memory/storage component(s), e.g., read only memory, programmable read only memory, solid-state memory, random access memory, optical and/or magnetic memory, etc. Computer-readable instructions embodying the method 50M of FIG. 4 may be recorded in memory 54 and executed by the processor(s) 52, e.g., as machine-readable code/instructions, software, and/or firmware programs.

Other hardware components of the schematically-depicted ECU 50 are omitted for simplicity but are well understood in the art, such as combinational logic circuits, input/output (I/O) circuits, digital and analog signal conditioning/buffer circuitry, and other hardware components that may be accessed as needed by the processor(s) 52 to provide the control functionality described herein. Execution of the method 50M of FIG. 4 as set forth herein also requires, in one or more embodiments, a keypoint machine learning (ML) model 55 and one or more three-dimensional ("3D") aerodynamic models 56 of the receiver 14 of FIG. 1, the alternatively constructed receivers 140 or 240 of FIGS. 3 and 5, or a fuel-receiving aircraft of a different construction.

Figure 3:
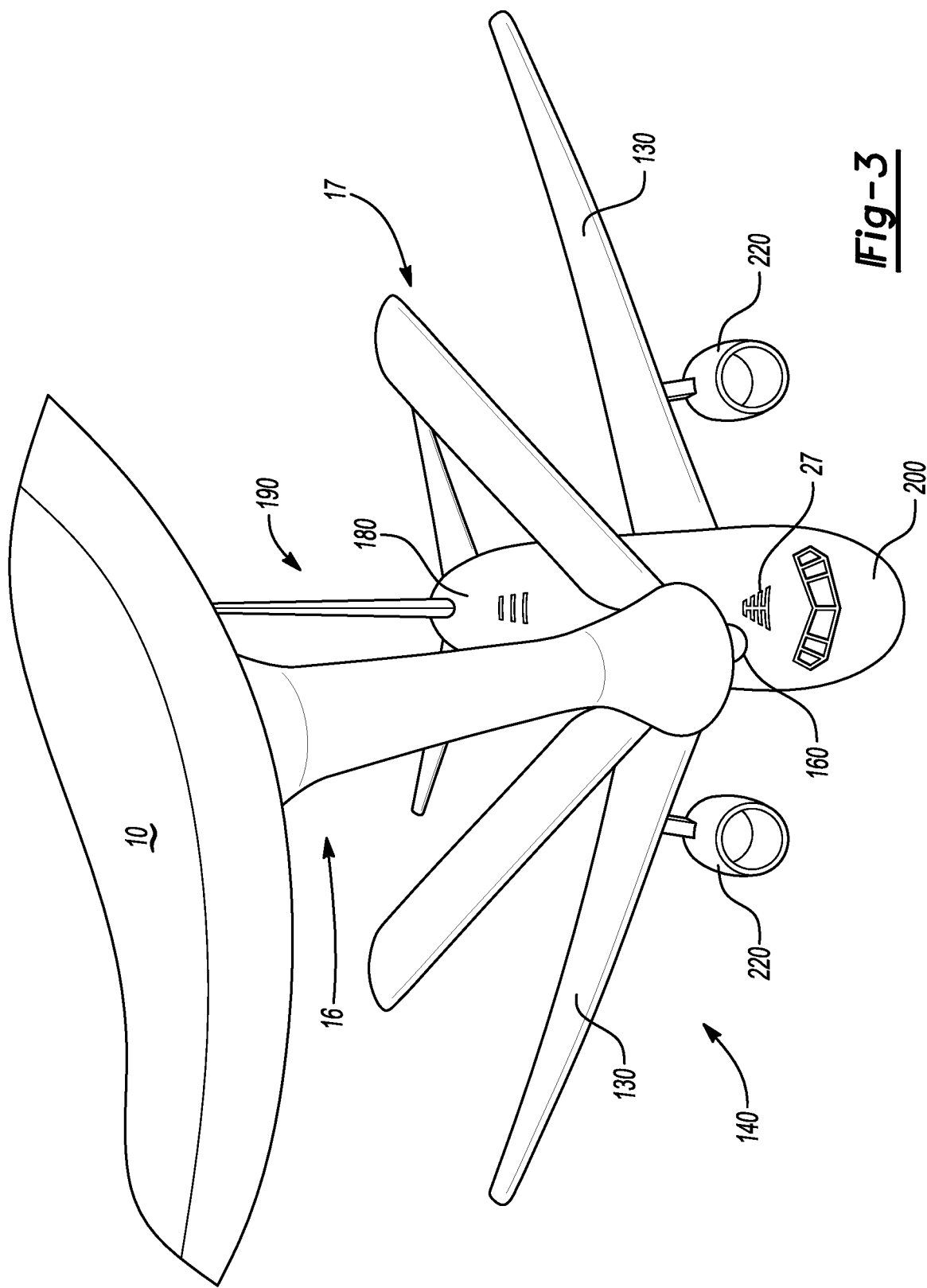
FIG. 3 illustrates a representative receiver in the process of engaging with a refueling boom of the exemplary tanker depicted in FIG. 1.

Referring to FIG. 3, the receiver 140 is shown flying in close formation behind the tanker 10. In this non-limiting example scenario, the receiver 140 is a cargo/transport aircraft having a fuselage 180, one or more wings 130, engines 220, and an empennage assembly 190. The refueling boom 16 is shown in the process of locating the receptacle 27, which in this instance is disposed on an upper surface of the fuselage 180 proximate a cockpit 200 of the receiver 140.

As with the exemplary receiver 14 of FIG. 1, as the receiver 140 of FIG. 3 approaches the tanker 10 the flight crew of the receiver 140 minimizes relative motion between the receiver 140 and the tanker 10. This occurs while the boom operators 12 of FIG. 2 maneuver the refueling boom 16 into proper position and alignment with the receptacle 27. During this carefully coordinated flying maneuver, the boom operators 12 remain informed of the current 3D position of the receiver 140 in free space by a video depiction of the receiver 140 and boom 16. Such information is presented in real-time via the HMI 500 of FIG. 2, possibly with suitable graphical overlays as determined via the method 50M.

With respect to object motion tracking in general, a system based entirely on tracking the current position and velocity of a tracked object, due to system complexities and processing latency, will tend to lag the object's true position and velocity. When tracking the receiver 14, 140, or 240 of respective FIGS. 1, 3, and 5, for instance, in a worst-case scenario the receiver 14, 140, or 240 could accelerate quickly and perhaps unexpectedly. In such a case, a traditional position tracking system will not respond in time, whether such a response includes initiating an evasive action of the boom 16 or executing a "breakaway" maneuver in which the receiver 14, 140, or 240 separates from a nozzle end 160 of the boom 16 and flies away from the tanker 10. The present approach as exemplified in FIG. 4 thus adds an additional layer of control safety and situational awareness.

Figure 4:
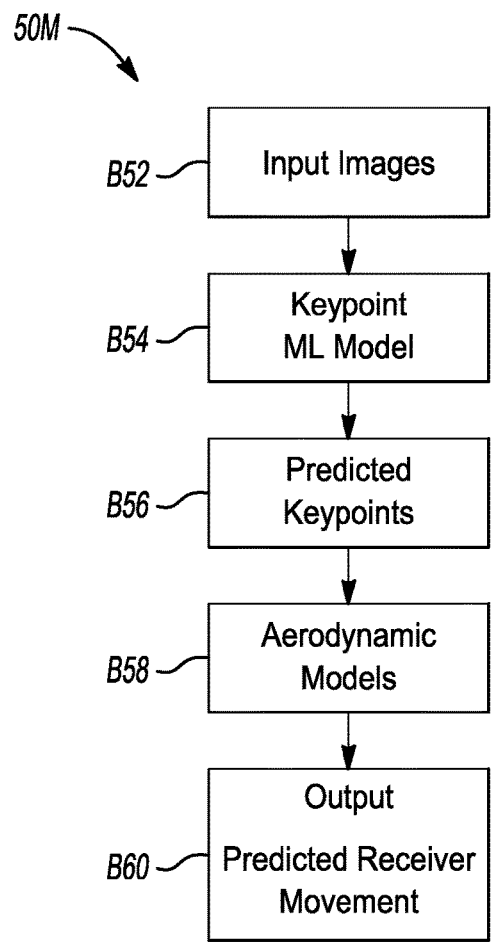
FIG. 4 is a flow diagram of a method for performing an A3R process in accordance with one or more embodiments of the present disclosure.
Figure 5:
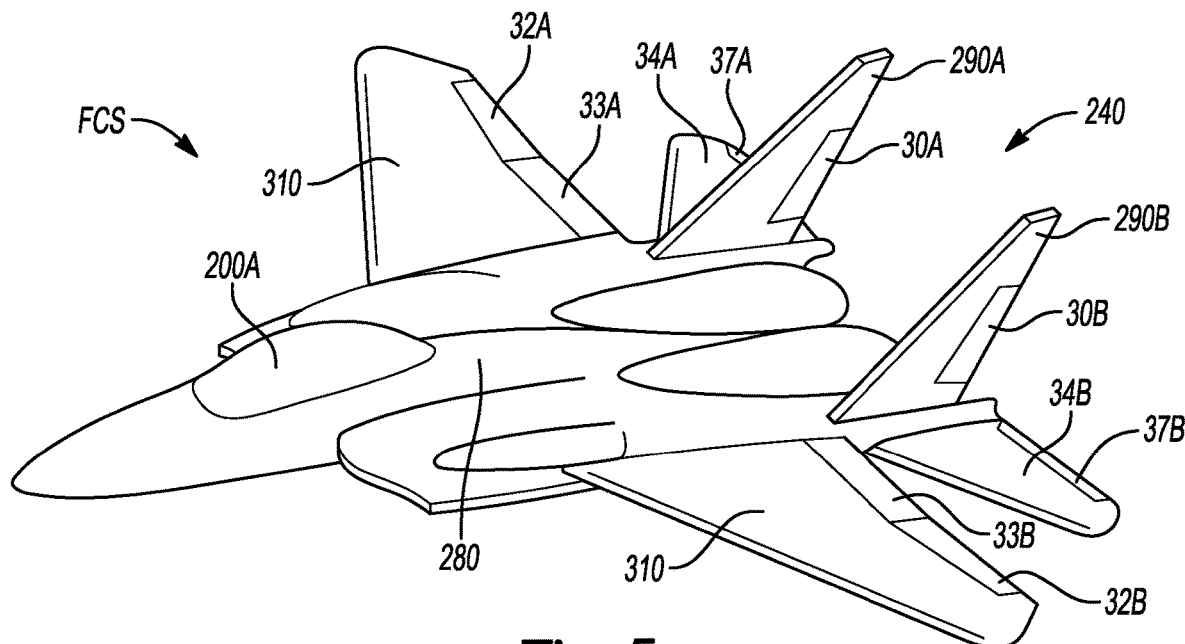
FIG. 5 is a perspective view illustration of a receiver having flight control surfaces whose positions are automatically detected and tracked and used in the course of performing the method exemplified in FIG. 4.

Referring to FIG. 4 in conjunction with the representative receiver 240 shown in FIG. 5, the method 50M is illustrated as a series of logic blocks for illustrative simplicity. As used herein, the term "block" refers to algorithms, code segments, sequences, or other constituent portions of the method 50M. The individual logic blocks are implemented by the ECU 50 of FIGS. 1 and 2 when performing the method 50M of FIG. 4 in accordance with the present disclosure.

Commencing with block B52 ("Input Images"), the method 50M includes receiving digital video images from the camera(s) 25 of FIGS. 1 and 2 via the ECU 50. The input images as contemplated herein include the constituent digital image frames of the captured video stream (arrow 250) shown in FIG. 2. The camera(s) 25 may include one or more rearward-facing monocular cameras as noted above. For instance, the camera(s) 25 may be part of an aircraft-mounted vision system providing the boom operators 12 of FIG. 2 with a high-definition real-time view of the refueling boom 16 and the receiver 240, and allowing the boom operators 12 to control motion of the boom 16 using a live/real-time image feed. The method 50M proceeds to block B54 once the ECU 50 has begun receiving the video stream (arrow 250) of FIG. 2 and the individual 2D image frames thereof.

Block B54 ("Keypoint ML Model") entails processing the input images from block B52 through the keypoint machine learning ("ML") model 55 shown schematically in FIG. 2. The keypoint ML model 55 may include one or more 3D models of the receiver 240, or more precisely of the various flight control surfaces thereof as represented by arrow FC in FIG. 5.

Referring briefly to FIG. 5, the depicted receiver 240 has a plurality of flight control surfaces (arrow FCS), the identities and locations of which will vary with the particular flight configuration of the receiver 240. In the illustrated embodiment, for instance, the receiver 240 includes a cockpit 200A located forward of one or more wings 310, with a fuselage 280 integrally formed with the cockpit 200A and the wings 310. For example, vertical stabilizers 290A and 290B may include a corresponding rudder 30A and 30B as shown. Horizontal stabilizers 34A and 34B may be situated adjacent the respective vertical stabilizers 290A and 290B, and equipped with elevators 37A and 37B, or the horizontal stabilizers 37A and 37B may function as an integrally formed elevator assembly. The wings 310 in turn may be equipped within elevons in the form of, e.g., inboard ailerons 32A, 32B and outboard flaps 33A, 33B. The receiver 240 or alternative constructions thereof, such as but not limited to the receiver 14 and 140 of FIGS. 1 and 3, respectively, may be equipped with these or other possible flight control surfaces (arrow FCS) within the scope of the disclosure. The method 50M of FIG. 4 proceeds to block B56 once the live video stream from block B52 has been processed through the keypoint ML model 55 as shown in FIG. 2.

Block B56 ("Predicted Keypoints") includes recording predicted keypoints on the receiver 240 within memory 54 of the ECU 50. As part of block B56, the ECU 50 identifies the flight control surfaces (arrow FCS of FIG. 5) in the various image frames of the video stream (arrow 250) received in block B52. For example, the ECU 50 may detect, identify, and localize specific features of interest in the various images using one or more computer vision algorithms that may be indicative of one or more of the flight control surfaces (arrow FCS of FIG. 5) or other variations of the receiver 240.

Identifying relevant keypoints as part of block B56 may include, e.g., using background subtraction ("BGS") to detect the keypoints as objects of interest in real-time, or scale-invariant feature transform ("SIFT"), speeded-up robust features ("SURF"), Faster R-convolutional neural networks, deep neural networks, etc. Once the keypoints have been identified in the 2D image frames, the ECU 50 may process the keypoints using, e.g., object recognition, image matching, and/or motion analysis software to help enable the A3R system 11 of FIG. 2 to track the current positions of the flight control surfaces (arrow FCS of FIG. 5). The method 50M then proceeds to block B58.

At block B58 ("Aerodynamic Models"), the ECU 50 of FIG. 2 processes the predicted keypoints from block B56 through the 3D aerodynamic model(s) 56 of the receiver 240 to ascertain a proper 2D-to-3D correspondence of the 2D images of the receiver 240 taken by the camera(s) 25 of FIGS. 1 and 2, and the 3D representation of the receiver 240 as represented via the 3D aerodynamic model(s) 56.

In one or more embodiments, implementation of block B58 may include comparing the positions of the tracked flight control surfaces (arrow FCS of FIG. 5) to data contained in one or more aerodynamic tables stored in memory 54 of the ECU 50. Such aerodynamic tables may be based on the type, airspeed, altitude, and possibly other parameters of the particular receiver 240. The 3D aerodynamic model(s) 56 may then output estimated aerodynamic forces on the receiver 240 based on the predicted or detected positions of the flight control surfaces (arrow FCS of FIG. 5). This information may be used by the ECU 50 of FIGS. 1 and 2 to estimate the current state and an imminent/future state of the receiver 240, including its 3D position in free space. This in turn informs the boom operators 12 and the ECU 50 of FIG. 2 as to how and to what extent the refueling boom 16 of FIGS. 1 and 3 will likely move in a next instant of time, and whether the boom 16 will likely be required to perform an evasive maneuver, such as executing a breakaway maneuver. The method 50M of FIG. 4 then proceeds to block B60.

Block B60 ("Output Predicted Receiver Movement") includes outputting, via the ECU 50 of FIGS. 1 and 2, a predicted motion trajectory of the receiver 240. Movement of the receiver 240 of FIG. 5 may be indicated via the HMI 500 of FIG. 2 in various ways, including but not limited to as a graphical overlay, an audible and/or visible alert, a tactile or haptic alert, and/or a text message indicative of the predicted motion of the receiver 240. Such look-ahead information could be used to inform the boom operators 12 and/or the ECU 50 of impending motion of the receiver 240. That is, with the data collected at a given point in time (t), motion of the flight control surfaces (arrow FCS of FIG. 5) may provide information as to motion at time (t+1) of the receiver 240. This would allow the boom operators 12 and/or the ECU 50 shown in FIG. 2 to respond more quickly to the impending motion of the receiver 240 than would otherwise be possible using a typical position and velocity tracking system of the type noted above.

For example, the receiver 240 shown in FIG. 5 may operate in stable flight at a position trailing the tanker 10, with the positions of the various flight control surfaces (arrow FCS) corresponding to steady-state operating conditions. Relative motion between the receiver 240 and the refueling boom 16 would be minimal in this case. During steady-state operation, a pilot of the receiver 240 could command a sudden change in elevation, pitch, yaw, and/or roll in response to any number of dynamic conditions, including air turbulence, a possible impending bird strike, glare or obstructed vision, mechanical or electrical faults, etc. Ordinarily, the boom operators 12 would rely on force feedback or other sensed values on the refueling boom 16 to alert the boom operators 12 as to the possible need for a breakaway maneuver. However, using the A3R system 11 of FIG. 2, the ECU 50 is able to more quickly discern that the receiver 240 is about to perform a flight movement that could require the refueling boom 16 to break away. The ECU 50 could then inform the boom operators 12 earlier in the process, and possibly before detectable forces are present on the boom 16.

Tracking keypoints on the various control surfaces helps predict motion of the receiver 240 based on the deflection of its control surfaces. Doing so will allow the ECU 50 or the boom operators 12 to call a breakaway condition and/or more accurately track the receiver's position, and the ECU 50 give a heads-up display to the boom pilot. Earlier warning capabilities of the A3R system 11 in turn would permit the boom operators 12 and/or the ECU 50 of FIG. 2 to take preemptive action to protect the refueling boom 16, the receiver 240, and the tanker 10, along with their respective flight crews. In this manner, the present teachings may help render A3R processes more responsive to real-time motion of the receiver 240. These and other benefits will be appreciated by those skilled in the art in view of the foregoing disclosure.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The following Clauses provide example configurations of a system and method for providing high-power optical amplification in accordance with the disclosure, as shown in the exemplary scenario of FIGS. 1-3 and disclosed herein.

Clause 1: An automated air-to-air refueling ("A3R") system for use with a tanker having a refueling boom, the A3R system comprising: a camera connected to the tanker in proximity to the refueling boom and configured to output a video stream of the refueling boom and a receiving aircraft ("receiver") during an aerial refueling process; a human-machine interface (HMI) located aboard the tanker; and an electronic control unit ("ECU") in communication with the camera and the HMI, wherein the ECU is configured to identify keypoints on the receiver indicative of flight control surfaces of the receiver, track corresponding positions of the flight control surfaces in real-time, predict a change in a three-dimensional ("3D") position of the receiver, as a predicted 3D position, using the corresponding positions of the one or more flight control surfaces, and output a directional indicator via the HMI that is indicative of the predicted 3D position.

Clause 2: The A3R system of clause 1, wherein the camera includes one or more rearward-facing monocular cameras connected adjacent to an end of the refueling boom.

Clause 3: The A3R system of either of clauses 1 or 2, wherein the HMI includes a display screen, and wherein the directional indicator includes a graphical overlay on the display screen.

Clause 4: The A3R system of any of clauses 1-3, wherein the ECU is programmed with a keypoint machine learning ("ML") model, and to identify the keypoints on the receiver using the keypoint ML model.

Clause 5: The A3R system of clause 4, wherein the keypoint ML model includes at least one of background subtraction ("SBS"), scale-invariant feature transform ("SIFT"), speeded-up robust features ("SURF"), faster R-convolutional neural networks, or deep neural networks.

Clause 6: The A3R system of any of clauses 1-5, wherein the ECU is programmed with one or more three-dimensional ("3D") aerodynamic models of the receiver, and is configured to predict the change in a 3D position of the receiver using the one or more 3D aerodynamic models of the receiver.

Clause 7: The A3R system of clause 6, wherein the one or more 3D aerodynamic models of the receiver include one or more aerodynamic tables for a type and airspeed of the receiver, and wherein the one or more 3D aerodynamic models of the receiver are configured to provide an estimated aerodynamic force on the receiver based on the predicted positions of the flight control surfaces.

Clause 8: The A3R system of any of clauses 1-7, wherein the refueling boom is a fly-by-wire device, and wherein the ECU is configured to control a flight maneuver of the refueling boom in response to operator inputs to the HMI.

Clause 9: A method for refueling a fuel-receiving aircraft ("receiver") during an automated air-to-air refueling ("A3R") process, comprising: receiving from a camera during the A3R process, via an electronic control unit ("ECU") aboard a tanker having a refueling boom, a real-time video stream of the receiver and the refueling boom, wherein the camera is connected to the tanker in proximity to the refueling boom; identifying keypoints on the receiver indicative of flight control surfaces thereof; tracking corresponding positions of the flight control surfaces in real-time via the ECU; predicting a change in a three-dimensional (3D) position of the receiver, as a predicted 3D position, using the corresponding positions of the one or more flight control surfaces; and outputting a directional indicator to the HMI, via the ECU, indicative of the predicted 3D position.

Clause 10: The method of clause 9, wherein receiving the real-time video stream includes operating a rearward-facing monocular camera connected adjacent to an end of the refueling boom.

Clause 11: The method of either of clauses 9 or 10, wherein the HMI includes a display screen, and wherein outputting the directional indicator to the HMI includes presenting a graphical overlay on the display screen.

Clause 12: The method of any of clauses 9-11, wherein the ECU is programmed with a keypoint machine learning ("ML") model, and wherein identifying the keypoints on the receiver includes using the keypoint ML model.

Clause 13: The method of clause 12, wherein using the keypoint ML model includes using one or more of a background subtraction (SBS), a scale-invariant feature transform (SIFT), a speeded-up robust features (SURF), a faster R-convolutional neural networks, or a deep neural network.

Clause 14: The method of any of clauses 9-13, wherein the ECU is programmed with one or more three-dimensional ("3D") aerodynamic models of the receiver, and wherein predicting the change in the 3D position of the receiver is performed using the one or more 3D aerodynamic models of the receiver.

Clause 15: The method of clause 14, wherein the one or more 3D aerodynamic models of the receiver include one or more aerodynamic tables for a type and airspeed of the receiver, further comprising: using the or more aerodynamic tables to provide an estimated aerodynamic force on the receiver based on the predicted positions of the flight control surfaces.

Clause 16: The method of any of clauses 9-15, wherein the refueling boom is a fly-by-wire device, further comprising: controlling a flight maneuver of the refueling boom in response to operator inputs to the HMI.

Clause 17: A tanker comprising: a fuselage having a nose and a tail end, and configured to transport a supply of aviation fuel; one or more wings connected to the fuselage; a refueling boom connected to the tail end; and an automated air-to-air refueling ("A3R") system, comprising: a rearward-facing monocular camera connected to the tail end of the fuselage of the tanker in proximity to the refueling boom, wherein the rearward-facing monocular camera is configured to output a video stream of the refueling boom and a fuel-receiving aircraft ("receiver") during an aerial refueling process; a human-machine interface ("HMI") having a display screen; and an electronic control unit ("ECU") in communication with the rearward-facing monocular camera and the HMI, wherein the ECU is configured to identify, using a keypoint machine learning model, keypoints on the receiver indicative of flight control surfaces thereof, track corresponding positions of the flight control surfaces in real-time using the keypoints, predict a change in a three-dimensional ("3D") position of the receiver as a predicted 3D position using the corresponding positions of the one or more flight control surfaces, and output a directional indicator to the HMI indicative of the predicted 3D position, wherein the directional indicator includes a graphical overlay on the display screen.

Clause 18: The tanker of clause 17, wherein the keypoint ML model includes at least one of background subtraction ("SBS"), scale-invariant feature transform ("SIFT"), speeded-up robust features ("SURF"), faster R-convolutional neural networks, or deep neural networks.

Clause 19: The tanker of either of clauses 17 or 18, wherein the ECU is programmed with one or more 3D aerodynamic models of the receiver, and is configured to predict the change in the 3D position of the receiver using the one or more 3D aerodynamic models of the receiver.

Clause 20: The tanker of clause 17, wherein the one or more 3D aerodynamic models of the receiver include one or more aerodynamic tables for a type and airspeed of the receiver, and wherein the one or more 3D aerodynamic models of the receiver are configured to provide an estimated aerodynamic force on the receiver based on the predicted positions of the flight control surfaces.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. An automated air-to-air refueling ("A3R") system for use with a tanker having a refueling boom, the A3R system comprising:
    a camera connected to the tanker in proximity to the refueling boom and configured to output a video stream of the refueling boom and a receiving aircraft ("receiver") during an A3R process, wherein the receiver includes flight control surfaces, the flight control surfaces including flaps, elevators, rudders, and/or ailerons;
    a human-machine interface (HMI) located aboard the tanker; and
    an electronic control unit (ECU) in communication with the camera and the HMI, wherein the ECU is configured to identify keypoints on the receiver indicative of the flight control surfaces of the receiver, track corresponding positions of the flight control surfaces in real-time using the keypoints while performing an A3R process between the tanker and the receiver, predict a change in a three-dimensional (3D) position of the receiver, as a predicted 3D position, using the corresponding positions of the one or more flight control surfaces, and output a directional indicator via the HMI that is indicative of the predicted 3D position, the directional indicator alerting a boom operator of a need to perform a breakaway maneuver of the refueling boom or another evasion action.

2. The A3R system of claim 1, wherein the camera includes one or more rearward-facing monocular cameras connected adjacent to an end of the refueling boom.

3. The A3R system of claim 1, wherein the HMI includes a display screen, and wherein the directional indicator includes a graphical overlay on the display screen.

4. The A3R system of claim 1, wherein the ECU is programmed with a keypoint machine learning ("ML") model, and to identify the keypoints on the receiver using the keypoint ML model.

5. The A3R system of claim 4, wherein the keypoint ML model includes at least one of background subtraction ("SBS"), scale-invariant feature transform ("SIFT"), speeded-up robust features ("SURF"), faster R-convolutional neural networks, or deep neural networks.

6. The A3R system of claim 1, wherein the ECU is programmed with one or more three-dimensional ("3D") aerodynamic models of the receiver, and is configured to predict the change in a 3D position of the receiver using the one or more 3D aerodynamic models of the receiver.

7. The A3R system of claim 6, wherein the one or more 3D aerodynamic models of the receiver include one or more aerodynamic tables for a type and airspeed of the receiver, and wherein the one or more 3D aerodynamic models of the receiver are configured to provide an estimated aerodynamic force on the receiver based on the predicted positions of the flight control surfaces.

8. The A3R system of claim 1, wherein the refueling boom is a fly-by-wire device, and wherein the ECU is configured to control a flight maneuver of the refueling boom in response to operator inputs to the HMI.

9. A method for refueling a fuel-receiving aircraft ("receiver") during an automated air-to-air refueling ("A3R") process, comprising:
    receiving from a camera during the A3R process, via an electronic control unit ("ECU") aboard a tanker having a refueling boom, a real-time video stream of the receiver and the refueling boom, wherein the camera is connected to the tanker in proximity to the refueling boom;
    identifying keypoints on the receiver indicative of flight control surfaces thereof, wherein the flight control surfaces include flaps, elevators, rudders, and/or ailerons;
    tracking corresponding positions of the flight control surfaces in real-time via the ECU using the keypoints while performing the A3R process between the tanker and the receiver;
    predicting a change in a three-dimensional (3D) position of the receiver, as a predicted 3D position, using the corresponding positions of the one or more flight control surfaces; and
    outputting a directional indicator to the HMI, via the ECU, indicative of the predicted 3D position, to thereby alert a boom operator of a need to perform a breakaway maneuver of the refueling boom or another evasive action.

10. The method of claim 9, wherein receiving the real-time video stream includes operating a rearward-facing monocular camera connected adjacent to an end of the refueling boom.

11. The method of claim 9, wherein the HMI includes a display screen, and wherein outputting the directional indicator to the HMI includes presenting a graphical overlay on the display screen.

12. The method of claim 9, wherein the ECU is programmed with a keypoint machine learning ("ML") model, and wherein identifying the keypoints on the receiver includes using the keypoint ML model.

13. The method of claim 12, wherein using the keypoint ML model includes using one or more of a background subtraction ("SBS"), a scale-invariant feature transform ("SIFT"), a speeded-up robust features ("SURF"), a faster R-convolutional neural networks, or a deep neural network.

14. The method of claim 9, wherein the ECU is programmed with one or more three-dimensional ("3D") aerodynamic models of the receiver, and wherein predicting the change in the 3D position of the receiver is performed using the one or more 3D aerodynamic models of the receiver.

15. The method of claim 14, wherein the one or more 3D aerodynamic models of the receiver include one or more aerodynamic tables for a type and airspeed of the receiver, further comprising:

using the or more aerodynamic tables to provide an estimated aerodynamic force on the receiver based on the predicted positions of the flight control surfaces.

16. The method of claim 9, wherein the refueling boom is a fly-by-wire device, further comprising:
controlling the breakaway maneuver or another evasive action as a flight maneuver of the refueling boom in response to operator inputs to the HMI.

17. A tanker comprising:
a fuselage having a nose and a tail end, and configured to transport a supply of aviation fuel;
one or more wings connected to the fuselage;
a refueling boom connected to the tail end; and
an automated air-to-air refueling ("A3R") system, comprising:
  a rearward-facing monocular camera connected to the tail end of the fuselage of the tanker in proximity to the refueling boom, wherein the rearward-facing monocular camera is configured to output a video stream of the refueling boom and a fuel-receiving aircraft ("receiver") during an automated air-to-air refueling ("A3R") process, the receiver having flight control surfaces comprising flaps, elevators, rudders, and/or ailerons;
  a human-machine interface (HMI) having a display screen; and
  an electronic control unit (ECU) in communication with the rearward-facing monocular camera and the HMI, wherein the ECU is configured to identify, using a keypoint machine learning model, keypoints on the receiver indicative of flight control surfaces thereof, track corresponding positions of the flight control surfaces in real-time using the keypoints, predict a change in a three-dimensional ("3D") position of the receiver as a predicted 3D position using the corresponding positions of the one or more flight control surfaces, and output a directional indicator to the HMI indicative of the predicted 3D position, the directional indicator alerting a boom operator of a need to perform a breakaway maneuver of the refueling boom or another evasive action, wherein the directional indicator includes a graphical overlay on the display screen.

18. The tanker of claim 17, wherein the keypoint ML model includes at least one of background subtraction (SBS), scale-invariant feature transform (SIFT), speeded-up robust features (SURF), faster R-convolutional neural networks, or deep neural networks.

19. The tanker of claim 17, wherein the ECU is programmed with one or more 3D aerodynamic models of the receiver, and is configured to predict the change in the 3D position of the receiver using the one or more 3D aerodynamic models of the receiver.

20. The tanker of claim 17, wherein the one or more 3D aerodynamic models of the receiver include one or more aerodynamic tables for a type and airspeed of the receiver, and wherein the one or more 3D aerodynamic models of the receiver are configured to provide an estimated aerodynamic force on the receiver based on the predicted positions of the flight control surfaces.

* * * * *